Dec. 21, 1954    T. B. KEESLING    2,697,362
ANGLE DRIVE AND BEARING STRUCTURE
Filed April 18, 1950

INVENTOR.
Thomas B. Keesling
BY
*Harper Allen*
ATTORNEY

United States Patent Office 2,697,362
Patented Dec. 21, 1954

2,697,362

ANGLE DRIVE AND BEARING STRUCTURE

Thomas B. Keesling, San Jose, Calif., assignor of one-half to C. H. Keesling, San Jose, Calif.

Application April 18, 1950, Serial No. 156,690

1 Claim. (Cl. 74—417)

The present invention relates to angle drive and bearing structure and is concerned more particularly with the provision of a structure including a common bearing member for angularly related shafts, bevel gears, and the like, which serve to accurately maintain the correct alignment between the parts and to provide a compact bearing structure by means of which two or more shafts, gears, or the like, can be brought readily to a desired related positioning. The drive structure also provides for ease of assembly of the component parts without possibility of misassembly of the same while providing for a slight yielding misalignment of the parts to compensate for minute manufacturing inaccuracies.

Figure 1:
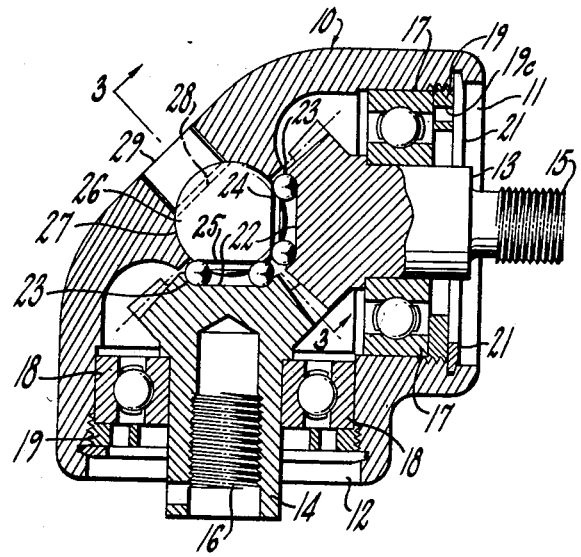
Figure 2:
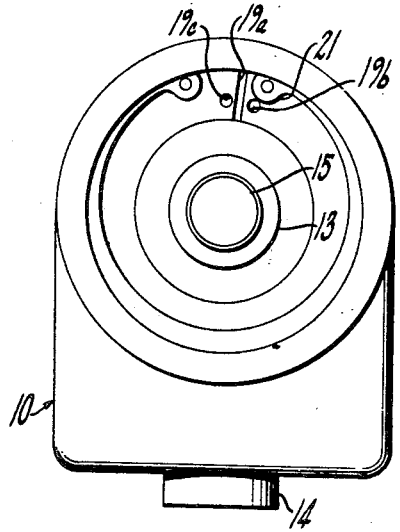
Figure 3:
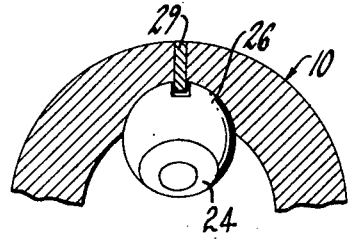

The above and other objects of the invention are attained in connection with certain preferred embodiments of the invention as illustrated in the accompanying drawings, in which:

Figure 1 is a sectional view through the drive unit.
Figure 2 is an elevational view of the drive unit.
Figure 3 is a fragmentary sectional view taken as indicated by the line 3—3 of Figure 1.

The instant invention is disclosed herein as embodied in a right angle drive structure or mechanism. The mechanism includes an angle shaped cast housing 10 having respective recessed ends 11 and 12 having respective bores disposed at right angles to each other to receive the shaft or hub portions of respective bevel gears 13 and 14 which have respective male and female threaded end portions 15 and 16. The gears 13 and 14 are journalled in respective bearings 17 and 18 held in place by adjusting or locking nuts 19 of special construction and having wedge type snap rings 21 of conventional construction associated therewith.

Referring to Figure 2, the locking nut 19 is split at 19a and is provided with two holes 19b and 19c for engagement by the pin of an adjusting wrench (not shown) the nut 19 is resilient and has a normal expanded condition of slightly larger diameter than the pitch diameter of its threads. In this way, the nut is compressed when in assembled position and frictionally engages the threads to provide a self-locking function. By selective use of the holes 19b and 19c in inserting and removing the nut, the friction or pressure is relieved during these operations. The width of the split 19a is not sufficient to allow radial compression of the nut 19 to disengage its threads from the cooperating female threads. The use of the wedge type retaining ring 21 may be omitted with a nut of this construction.

The respective ends of the bevel gears 13 and 14 are similarly constructed to form a part of a bearing structure and for this purpose have their respective end faces 22 recessed to form bearing races for a series of anti-friction elements or balls 23 which are also seated in respective bearing races 24 and 25 formed in a bearing member 26, which is preferably of spherical shape. The respective races 24 and 25 are disposed at right angles to each other to present themselves to respective end faces 22 of the gears when in proper alignment. The ball 26 preferably freely seats in a spherical socket 27 formed in the housing 10 and has a transverse slot 28 to receive a key 29 press-fitted into the housing 10. As seen in Figures 1 and 3, the key 29 and the slot 28 are disposed in a plane containing the axes of the respective races 24 and 25 so that the seating of the spherical member 26 upon its key 29 properly aligns these races with respect to the complementary races formed in the ends of the bevel gears 13 and 15. Preferably a slight clearance is provided between the key 29 and the slot 28 to allow a slight shifting movement of the bearing member 26 to compensate for minute inaccuracies in manufacturing.

While I have shown and described certain preferred embodiments of the invention, it will be understood that the invention is capable of variation and modification from the form shown, so that its scope should be limited only by the scope of the claims appended hereto.

I claim:

A bearing assembly comprising a housing having respective bores therein disposed at an angle to each other, a pair of intergeared rotatable members, respective bearings supporting said members, means restraining said members against axial movement outwardly of said respective bores, the inner end faces of said members having recesses providing respective bearing races, a spherical seat in said housing, a relatively large generally spherical bearing member occupying said seat and having annular grooves inwardly of said seat providing a second pair of bearing races disposed in spaced parallel relation respectively to said first-named bearing races, said first-named bearing races being of greater diameter than the second-named bearing races, and respective series of anti-friction bearing balls seated in said respective pairs of bearing races.

References Cited in the file of this patent

UNITED STATES PATENTS

| Number | Name | Date |
|---|---|---|
| 669,945 | Moomy | Mar. 12, 1901 |
| 1,145,762 | Freeman | July 6, 1915 |
| 1,604,298 | Neitzel | Oct. 26, 1926 |
| 2,198,921 | Shaff | Apr. 30, 1940 |
| 2,283,850 | Danforth | May 19, 1942 |
| 2,462,647 | Koza | Feb. 22, 1949 |
| 2,465,309 | Happe | Mar. 22, 1949 |

FOREIGN PATENTS

| Number | Country | Date |
|---|---|---|
| 671,811 | Germany | Feb. 14, 1939 |